Nov. 18, 1969  E. RUDY  3,479,155
HEAT-SHOCK RESISTANT SHAPED HIGH TEMPERATURE
METAL CERAMIC BODIES

Filed Nov. 7, 1966  3 Sheets-Sheet 1

INVENTOR.
ERWIN RUDY

BY

OSTROLENK, FABER, GERB & SOFFEN
ATTORNEYS

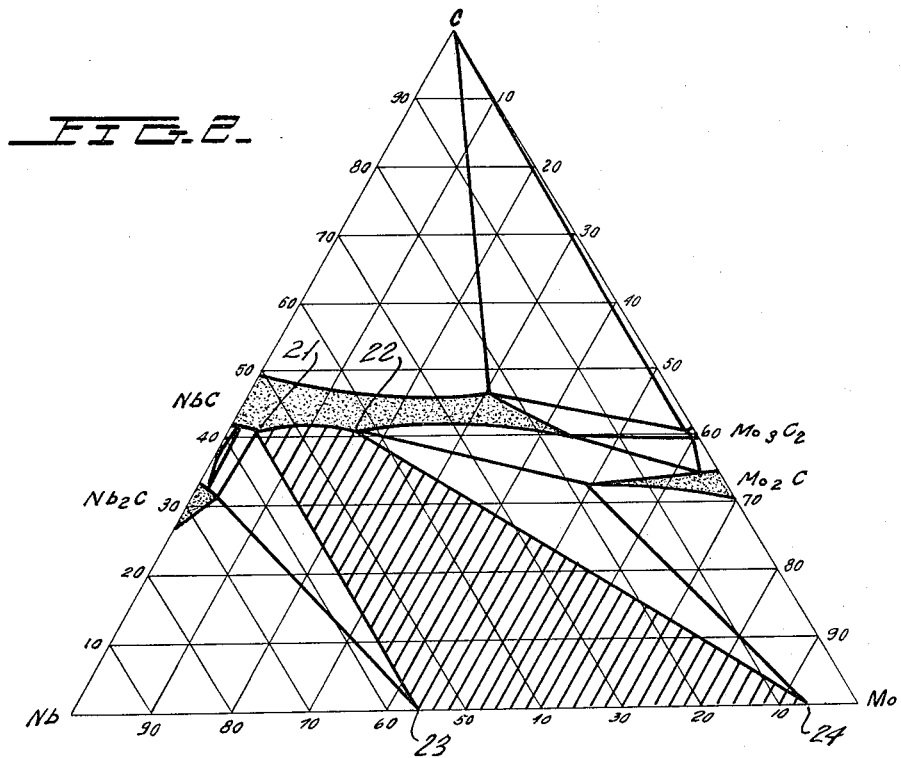
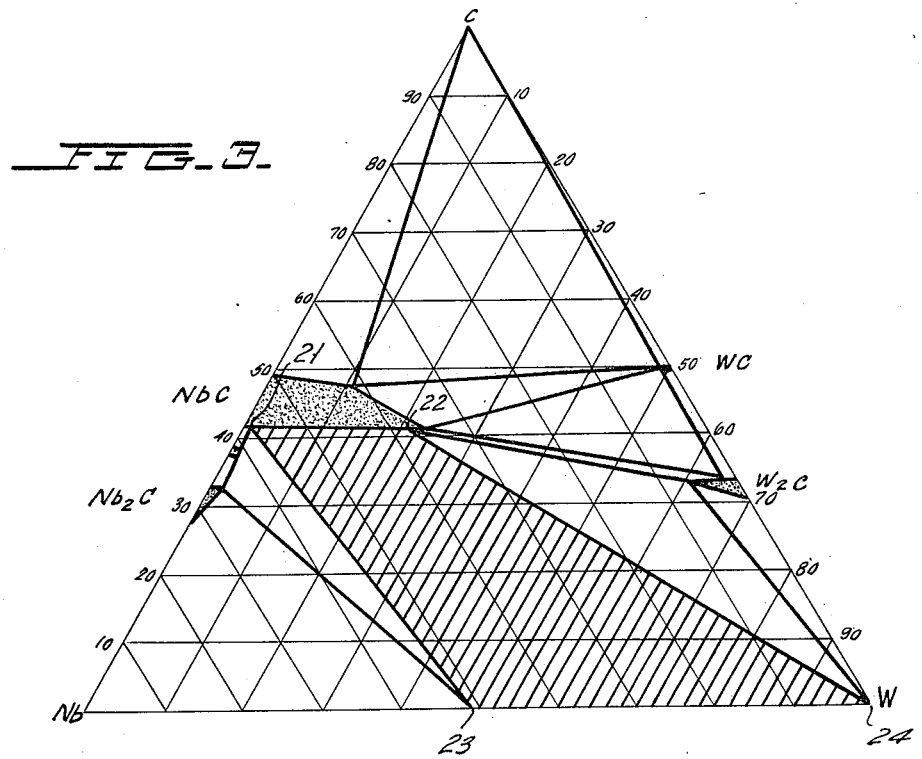

United States Patent Office

3,479,155
Patented Nov. 18, 1969

3,479,155
HEAT-SHOCK RESISTANT SHAPED HIGH TEMPERATURE METAL CERAMIC BODIES
Erwin Rudy, Carmichael, Sacramento, Calif., assignor to Schwarzkopf Development Corporation, New York, N.Y., a corporation of Maryland
Continuation-in-part of application Ser. No. 324,803, Nov. 19, 1963. This application Nov. 7, 1966, Ser. No. 600,330
Claims priority, application Austria, Nov. 20, 1962, A 9,113/62
Int. Cl. C22c 29/00; B22f 3/26
U.S. Cl. 29—182.7                                4 Claims

ABSTRACT OF THE DISCLOSURE

Homogeneous sintered, heat-shock resistant bodies consisting of homogeneous particles combining 10 to 95 wt. percent of a carbide phase with the balance of a metal phase. The carbide phase consists of one or more of the carbides of Nb, Ta with up to 40 mol percent of a Mo- and/or W-carbide and with the ingredients of these carbide and metal phases falling within the fields between points 21, 22, 23 and 24 of the ternary diagrams of FIGS. 2 through 5. All these homogeneous particles should be free of subcarbides and consist of pulverized particles of a hard structure obtained by sintering or melting particle mixtures of their respective ingredients Nb, Ta, C, Mo and W in the specified proportions. Up to 90 mol percent of the specified Nb- and Ta-carbides may consist of one or more of the Hf-, Zr- or Ti-carbides.

---

This application is a continuation-in-part of our co-pending application Ser. No. 324,803, filed Nov. 19, 1963, and now abandoned.

The invention relates to shaped hard bodies which will retain high strength and remain stable at high operating temperatures, exceeding 2,000° and/or 2,500° C. and which may be raised rapidly to such high operating temperature or subjected to heat shocks without destroying or impairing their strength and stability. It also relates to the production of such bodies. Such shape-retaining hard bodies are of critical importance in rocket nozzles and analogous to other applications.

The article of E. Rudy, F. Benesovsky and K. Sedlatschek published in 1960 in Monatshefte Fur Chemie, vol. 92, pages 841–855, briefly designated "Mh. Chem. 91, 126 (1960)," reports an investigation of the ternary composition system consisting of niobium (Nb), molybdenum (Mo), and carbon (C) having high melting temperatures. The ternary constitution or equilibrium diagram of this ternary Nb-Mo-C system at 1,900° C. is shown on page 846 of this Rudy et al. article and is reproduced in FIG. 1 hereof. As shown in the ternary diagram of the system Nb-Mo-C, it contains not only monocarbides of Nb and Mo, i.e., NbC and MoC, but also their subcarbides $Nb_2C$ and $Mo_2C$.

Heretofore formed hard bodies of such ternary compositions system could not be used in applications wherein such body had to be rapidly heated from normal temperatures, such as 100° C. or lower, to high operating temperature, of 2,000° C. and higher. When rapidly heated or subjected to heat shocks such ternary composition bodies developed cracks, disintegrated and failed.

Among the objects of the invention are strong bodies formed of such and similar ternary composition systems of high melting temperature which, when rapidly heated from normal low to high operating temperatures and so subjected to heat shocks, will retain the required strength, remain stable and will not crack or disintegrate.

The present invention is based on the discovery that strong shaped bodies formed by the ternary composition system consisting of Nb-Mo-C will retain their strength and stability under heat shocks when rapidly heated from low or normal temperature to high temperature, such as 2,000° C. and higher, but below their softening temperature, only if the chosen body compositions have a specially limited proportion and ratio of its carbide phase and metal phase ingredients, which insures that it remains free from the respective subcarbides and contains only the monocarbides.

The present invention is also based on the further discovery that the ternary composition systems selected from the group consisting of Ta-W-C, Ta-Mo-C and Nb-W-C may likewise be used for hard bodies which will retain their strength and stable shape under heat shocks by rapid heating from normal to high temperatures, but only if the chosen respective body composition has specially limited proportions of its respective mono-carbide and metal phase ingredients, which assure that they remain free from subcarbides under heat shocks of rapid heating from low to high temperature.

The present invention is also directed to novel methods for producing such hard bodies.

The foregoing and other objects of the invention will be best understood from the following description of exemplifications thereof, reference being had to the accompanying drawings wherein FIG. 1 is a ternary composition diagram of the composition system of Nb-Mo-C;

FIG. 2 is the same ternary diagram as in FIG. 1 wherein the paralleled shaded area shows the limited composition range of the invention which yield strong bodies which may be rapidly heated to high operating temperatures without loss of the required strength and stability;

FIGS. 3, 4 and 5 are ternary composition diagrams similar to FIG. 2 of the three systems Nb-W-C, Ta-Mo-C and Ta-W-C, respectively, in each of which the parallel shaded area shows the limited range of the respective compositions of the invention which yield strong bodies which may be rapidly heated to high operating temperature without loss of the required strength and stability.

Figure 1:
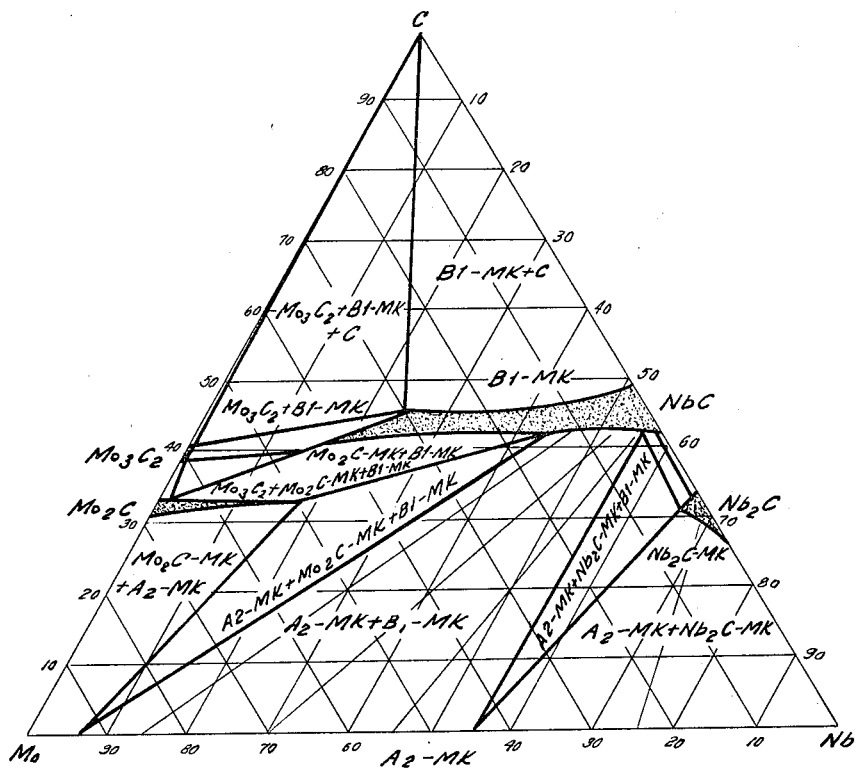

FIG. 1 and the above-identified Rudy et al. article, Mh. Chem. 92, 581 (1962), fully describe the ternary constitution diagram of the niobium-molybdenum-carbon system at 1,900° C., representative of bodies having a high melting temperature to which the present invention relates, and they require no further explanation.

Referring to FIG. 1, and the Rudy et al. article, it has already been proposed to use monocarbides of high melting temperature for hard, shaped bodies that have to retain the required strength and shape at temperatures exceeding 2,000° C. As examples, tantalum carbide and hafnium carbide melt under atmospheric pressure at about 3,900° C.; tantalum-hafnium mixed carbides melt above 4,000° C., and they also exhibit good erosion resisting strength at high operating temperatures of 2,000° C. and higher.

However, bodies formed of pure carbides are very brittle and have only low temperature stability. They have to be carefully and slowly raised to high temperature in order to avoid cracking and destruction of such bodies. To meet this problem, attempts have been made to combine the carbide phase of such hard bodies with a metal phase of high melting temperature. Although such carbide-phase metal-phase bodies have somewhat greater ductility at room temperature, their strutcures are likewise destroyed when their temperature is raised from room or normal temperature to 2,000° C. and higher.

The present invention is based on the discovery that such failures of heretofore known carbide-phase metal-phase bodies are caused by the presence or development therein of subcarbides, such as $Ta_2C$, in a body formed of tantalum monocarbide TaC and tungsten W, for example. On heating such body formed of the TaC and W phases, the carbide phase attacks a substantial part of the metal phase resulting in development of the subcarbide phase $Ta_2C$. It was discovered that upon raising the temperature of such body, its subcarbides undergo dimensional particle changes which result in the development of cracks and in many cases the destruction of the body. On further temperature rise, the subcarbides disintegrate into monocarbide and metallic phases, resulting in further dimensional particle changes and splitting of the body material.

In accordance with the invention, strong shaped bodies of high melting temperature combining a mono-carbide phase with a metal phase having the required strength temperature stability and do not crack when rapidly heated from low or normal temperatures to high temperatures in excess of 2,000° or 2,500° C. are obtained and so subjected to heat shocks by limting the range and ratio of its mono-carbide and metal phase ingredients so that the bqdy is free from sub-carbides. More particularly the invention is concerned with bodies combining a tantalum monocarbide phase with a tungsten or molybdenum metal phase or combining a niobium monocarbide phase with a tungsten or molybdenum metal phase. In accordance with the invention the relative proportions of the mono-carbide phase and of the metal phase of such bodies are so chosen as to exclude the formation of subcarbides at operating temperatures exceeding 1,500° C. and preferably exceeding 2,000° C. Depending on the application, the proportion of the monocarbide phase shall be within the range of 10% to 95% by weight of the body. In many cases, an addition of 5% in weight of the metallic phase is sufficient to eliminate subcarbides and give the combined carbide phase-metal phase body the desired temperature stability which under heat shocks or rapid temperature rise thereof to 2,000° C. and higher without loss of required strength and stability.

The present invention is based on the surprising discovery that the formation of undesirable subcarbides on rapid heating of such bodies is eliminated and the required strength and stability under rapid heating is assured by limiting the ratio and proportion of the carbide and metal phase ingredients of the bodies of the invention to a specific ratio and proportion ranges, as explained hereinafter, in connection with FIGS. 2 through 5.

FIG. 2 is a ternary constitution diagram of niobium-molybdenum-carbon system, the hatched parallel-line shaded area within the four corners 21, 22, 23, 24 containing only the carbide-phase metal-phase compositions of the invention which are free from subcarbides and have the required strength and temperature stability.

FIG. 3 is a similar ternary diagram of the niobium-tungsten-carbon system, the shaded area within corners 21, 22, 23, 24 containing only the carbide-phase metal-phase compositions of the invention having the required strength and temperature stability.

Figure 4:
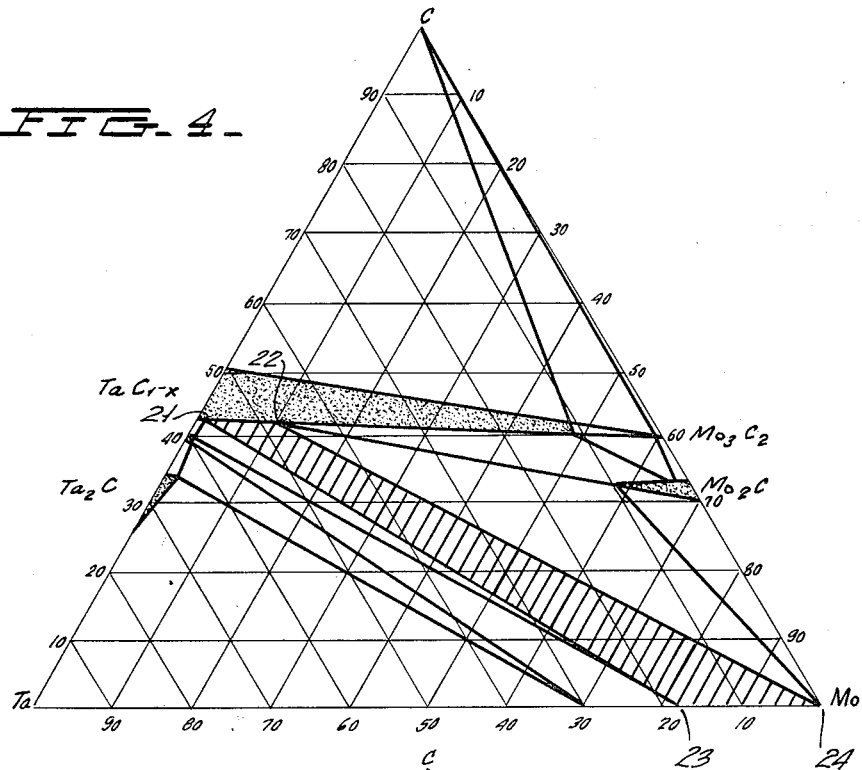
Figure 5:
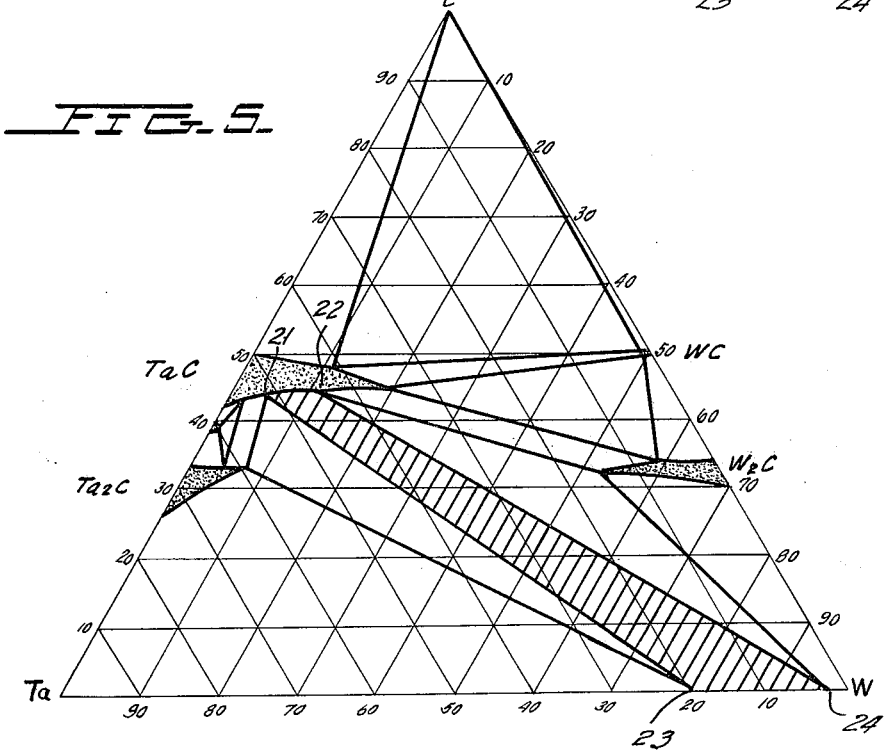

FIGS. 4 and 5 are similar ternary diagrams of the systems of tantalum-molybdenum-carbon and tantalum-tungsten-carbon, respectively, the shaded area parallel shading lines within the four corners 21, 22, 23, 24 containing only compositions of the invention combining the tantalum carbide phase with the respective tungsten and molybdenum metal phase which assures the required strength and temperature stability.

The ternary constitution diagram of FIGS. 2 to 5 represent the respective systems at 1,900° C. However, the relations of various system phases shown in these diagrams change very little for lower temperatures and remain substantially the same for higher temperatures up to melting temperature.

All four ternary systems shown in FIGS. 2 to 5 are characterized by a wide range of mixed crystals of the monocarbide phases of NbC and TaC with WC, and $Mo_3C_2$, respectively. These mixed carbide crystals have face centered lattice of the sodium chloride crystal type. The subcarbides $Nb_2C$, $Ta_2C$, $Mo_2C$ and $W_2C$ have a hexagonal and isotype crystal structure. On the basis of their lattice parameters, it was to be expected that the above named subcarbides of the metals of group 5a of the periodic system of elements will be fully mixable with the above named subcarbides of the metals of group 6a of the periodic system. Unexpectedly, however, it was found that they do not mix, and that only relatively small fields of homogeneous mixture crystals MeC are present in such systems, Me representing either one of the elements Nb, Ta, Mo or W.

The present invention is based on the discovery that although tungsten, molybdenum, niobium and tantalum will form subcarbides when they are not alloyed with other metals, the formation of subcarbides of niobium carbide and tantalum carbide will be avoided if predetermined proportions of tungsten and molybdenum are combined with these carbides. The invention is based on the discovery that strong stable bodies may be formed from the limited composition ranges of the four ternary systems represented by the ternary diagrams of FIGS. 2 to 5, defined by the parallel-shaded-lines areas of these ternary diagrams only if their system elements are so proportioned as to yield bodies which contain only the respective monocarbide and metal phases and which are free of any of the subcarbides. Tests have established that bodies formed of compositions falling within the ranges defined by the shaded fields of the ternary diagrams, FIGS. 2–5, may be heated rapidly from room temperature to a very high operating temperature of 2,000° C. and higher without any substantial changes in the crystal structures provided, of course, that the individual phases are chosen so that they are in equilibrium.

As seen in the ternary system diagrams FIGS. 2–5, the metallic phase may contain, in addition to tungsten and/or molybdenum, of up to 60 at. percent of niobium and up to 30 at. percent of tantalum or an equivalent addition of an alloy mixture of niobium and tantalum corresponding to the foregoing proportions. The niobium and tantalum carbide phases may also contain alloy additions of tungsten carbide and/or molybdenum carbide up to 40 mol percent. Furthermore, it is also possible to use instead of the tantalum carbide and niobium carbide phases other similar high melting metal carbide phases. It has been found that hard bodies with similar excellent high temperature heat-shock stability characteristics may be obtained if the tantalum carbide and niobium carbide phase is replaced with up to 90 mol percent of hafnium carbide, zirconium carbide or titanium carbide or a mixture of these carbides.

Shaped bodies formed of combined carbide and metal phase compositions of the invention of the type described above may be produced by powdered metallurgy techniques. In accordance with the invention the desired shaped bodies of such compositions are formed of powder particles which contain the carbide phase and metal phase ingredients in the critical specified limited proportion ranges. Such specified carbide and metal-phase powder particles may be produced out of powder mixture which contains the different composition elements in the proper above-specified proportions, which powder mixture is combined and homogenized by sintering or melting the homogenized product being broken up and pulverized. The resulting homogenized powder is then compacted under pressure into the desired shape and sintered either in a neutral protective atmosphere or under vacuum.

Even when sintering shaped powder body compacts at very high temperatures it is very difficult to so obtain bodies of 100% density. In most cases they have a certain small remaining porosity.

In some applications requiring bodies of very high density, the powder mixture described above for forming the finally shaped bodies has thoroughly admixed thereto a small alloy addition of a lower melting metal. Such low melting additions may consist of nickel or an alloy of nickel with copper. By forming the body of powder particles consisting of the above specified, the carbide-phase metal-phase ingredients mixed with nickel powder particles the desired sintered powder particles body of high density is obtained at sintering temperatures of 1,400° to 1,900° C., the nickel powder addition being liquid at such temperatures. Other metals of the iron group of the periodic system may be used instead of nickel or in combination with the copper addition.

Carbide-phase metal-phase high-temperature bodies of the invention described above are also of value in applications which require a porous skeleton which is infiltered with low melting-temperature metals, for example, copper or silver, the evaporation of which serves to cool such body. Bodies of the required porosities may be formed out of a compact of powder particles of the specially proportioned compositions of the invention described above which have been sintered in a known manner to yield a body of the required higher porosity. The so-obtained sintered high porosity body is then infilterated with lower melting metals such as copper and/or silver.

There will now be given examples for producing high-temperature bodies of the invention described above.

EXAMPLE 1

There is prepared and thoroughly mixed powder mixture containing 45 at. percent tantalum, 20 at. percent tungsten and 35 at. percent carbon. After thoroughly mixing, the powder body is compressed into compact or compacts under pressure of four tons per square centimeter (4 ton/cm.$^2$). The compacts are then treated for about one hour in a vacuum furnace at 1,800° C. to bring about the reaction and homogenization of the ingredients into the respective carbide and metal phases. The resulting porous reaction body is then broken up into coarse particles followed by milling into small powdered particles in a hard ball mill for about two hours. From the resulting ball milled powder mixture are separated by sieves powder particles of less than 60 microns. These fine powder particles are then further ground under an organic liquid, such as acetone, for 60 hours. The resulting fine powder brew is then filtered and the separated fine powder dried.

The so obtained dry powder is then mixed with 1% by weight nickel and the resulting powder mixture is then compacted within a die into a compact having the shape of the desired body having green strength which will retain its shape for subsequent sintering treatment. The compact is then presintered under a protective atmosphere or vacuum at about 1,000° C. for one hour to give it the strength required for further shaping into final shape. The finally-shaped presintered body is thereafter sintered to final strength within a vacuum furnace at 1,550° to 1,650° C. for about two hours. The surface of the resulting dense finally-shaped body is then given finishing treatment as by grinding, polishing and lapping. The so obtained finished body contains 85 mol percent of the tantalum monocarbide phase, the balance consisting of tungsten rich metal phase.

EXAMPLE 2

A mixture of fine powder particles of the elements tantalum, niobium, molybdenum, tungsten and carbon, in at. percent proportions 30/10/20/10/30 is subjected to a reaction treatment as in Example 1, yielding powder particles each of which consists of 70 mol percent of a tantalum rich monocarbide phase with the balance consisting of a predominantly tungsten and molybdenum containing metal phase. The niobium principally alloys with the tantalum and both essentially constitute the monocarbide phase. To the extent that they do not constitute carbides they will constitute part of the metal phase.

After further treating the so obtained powder as in Example 1, the resulting powder, without any further metal additions, is compacted into the desired shaped body which is thereafter sintered under vacuum at 1,500° to 2,200° C. for several hours, depending on the desired porosity of the final body. The powder mixture may contain known heat decomposable pore forming additions which decompose and escape in the sintering operation so that the sintered body has the desired porosity. The resulting sintered bodies are given the final shape by conventional machining, and if full density is desired, it is infiltrated with nickel and/or copper and/or silver or other alloys at 1,100° to 1,400° C.

In accordance with the invention in forming the desired body, the carbide powder particles are mixed with metal particles in the form of fibers or wire or wire mesh portions before subjecting the mixture to the reaction treatment. Shaped bodies of the invention formed out of such initial ingredient mixture exhibit outstanding mechanical strength and temperature stability. The filamentary ingredients, for instance, as wires or wire mesh, are mixed in the required proportion with the other ingredients before subjection to the further treatments described above.

Since the claim phrase "free from subcarbides" may be objected to, it should be understood that the alternative expression "containing at most 0.01 at. percent of subcarbides," used in the specification or claims hereof, is intended to have the same meaning as "free from subcarbides."

The present invention is of importance in all applications wherein a shaped body has to be exposed to high temperatures within a reducing atmosphere or an atmosphere exerting only weak oxidizing action. Examples of such applications are furnace parts or machine parts operating at high temperature under a protective gas or under a reducing or weak-oxidizing atmosphere, such as gas turbine buckets, rocket nozzles, and others.

The exemplifications of the invention described above will suggest other modifications and applications thereof and the claims shall not be limited thereto.

What is claimed is:

1. A shaped hard body consisting of sintered fine nomogeneous powder particles with each sintered particle consisting of a monocarbide phase and a metal phase,
    said body being subject to rapid heating from low normal temperature to high temperature exceeding 2000° C.,
    said carbide phase of each particle constituting 10 to 95 weight percent and the metal phase being the balance of each particle and being in equilibrium with said carbide phase at all operating temperatures,
    the composition of each particle being selected from at least one of the combinations consisting of
    (a) the combination of niobium monocarbide with a metal phase consisting of molybdenum and molybdenum alloyed with up to 5% atomic percent of niobium falling within the field between points 21, 22, 23 and 24 of the ternary diagram of FIG. 2,
    (b) the combination of niobium monocarbide with a metal phase consisting of tungsten and tungsten alloyed with up to 58 atomic percent of niobium and with ingredient proportions falling within the field between points 21, 22, and 24 of the ternary diagram of FIGURE 3,
    (c) the combination of tantalum monocarbide with a metal phase consisting of molybdenum and molybdenum alloyed with up to 30 atomic percent of tantalum and with ingredient proportions falling within the field between points 21, 22, 23 and 24 of the ternary diagram of FIGURE 4, and
    (d) the combination of tantalum monocarbide with a metal phase consisting of tungsten and tungsten alloyed with up to 30 atomic percent of tantalum and with ingredient proportions falling within the field between points 21, 22, 23 and 24 of the ternary diagram of FIGURE 5, with said specified niobium carbide phase and said tantalum carbide phase containing up to 40 mol percent of molybdenum carbide or tungsten carbide and tungsten carbide within the above specified proportion ingredients, each of said above-specified homogeneous particles consisting of pulverized particles of a hard structure consisting of sintered or melted and reacted particles of one or more particle mixtures consisting of (i) a mixture of particles of niobium, molybdenum and carbon in proportions specified in said combination (a) or (ii) a mixture of particles of niobium, tungsten and carbon in proportions specified in said combination (b) or (iii) a mixture of particles of tantalum, molybdenum and carbon in proportions specified in said combination (c) or (iv) a mixture of particles of tantalum, tungsten and carbon in proportions specified in said combination (d), said above-specified fine carbide-phase and metal-phase containing homogeneous particles having been sintered at temperatures exceeding 1400° C. into a shaped hard homogeneous body having the property of retaining a predetermined high strength and composition stability when subjected to rapid heat-shock heating from low normal temperature to high operating temperature exceeding 2000° C.

and being essentially free of subcarbides.

2. A shaped hard sintered-particle body as claimed in claim 1, wherein said specified niobium carbide phases and tantalum carbide, respectively, of said homogeneous sintered particles contain 0 to 90 mol percent of at least one of further carbides selected from the group consisting of hafnium carbide, zirconium carbide and titanium carbide.

3. A shaped hard homogeneous sintered-particle body as claimed in claim 1, wherein said body has pores, the pores of said body containing 0 to 5% of at least one metal selected from the group consisting of the metals of the iron group of the periodic system and of copper and silver.

4. A shaped hard homogeneous sintered-particle body as claimed in claim 2, wherein said body has pores, the pores of said body containing 0 to 5% of at least one metal selected from the group consisting of the metals of the iron group of the periodic system and of copper.

References Cited

UNITED STATES PATENTS

| | | | |
|---|---|---|---|
| 2,039,822 | 5/1936 | McKenna | 29—182.8 |
| 2,106,162 | 1/1938 | Balke | 29—182.8 |
| 2,123,575 | 7/1938 | McKenna | 29—182.8 |
| 2,123,576 | 7/1938 | McKenna | 29—182.7 |
| 2,553,714 | 5/1951 | Lucas | 29—182.8 |
| 3,149,411 | 9/1964 | Smiley et al. | 29—182.7 |

BENJAMIN R. PADGETT, Primary Examiner

R. L. GRUDZIECKI, Assistant Examiner

U.S. Cl. X.R.

29—182.1, 182.8